United States Patent Office 3,507,614
Patented Apr. 21, 1970

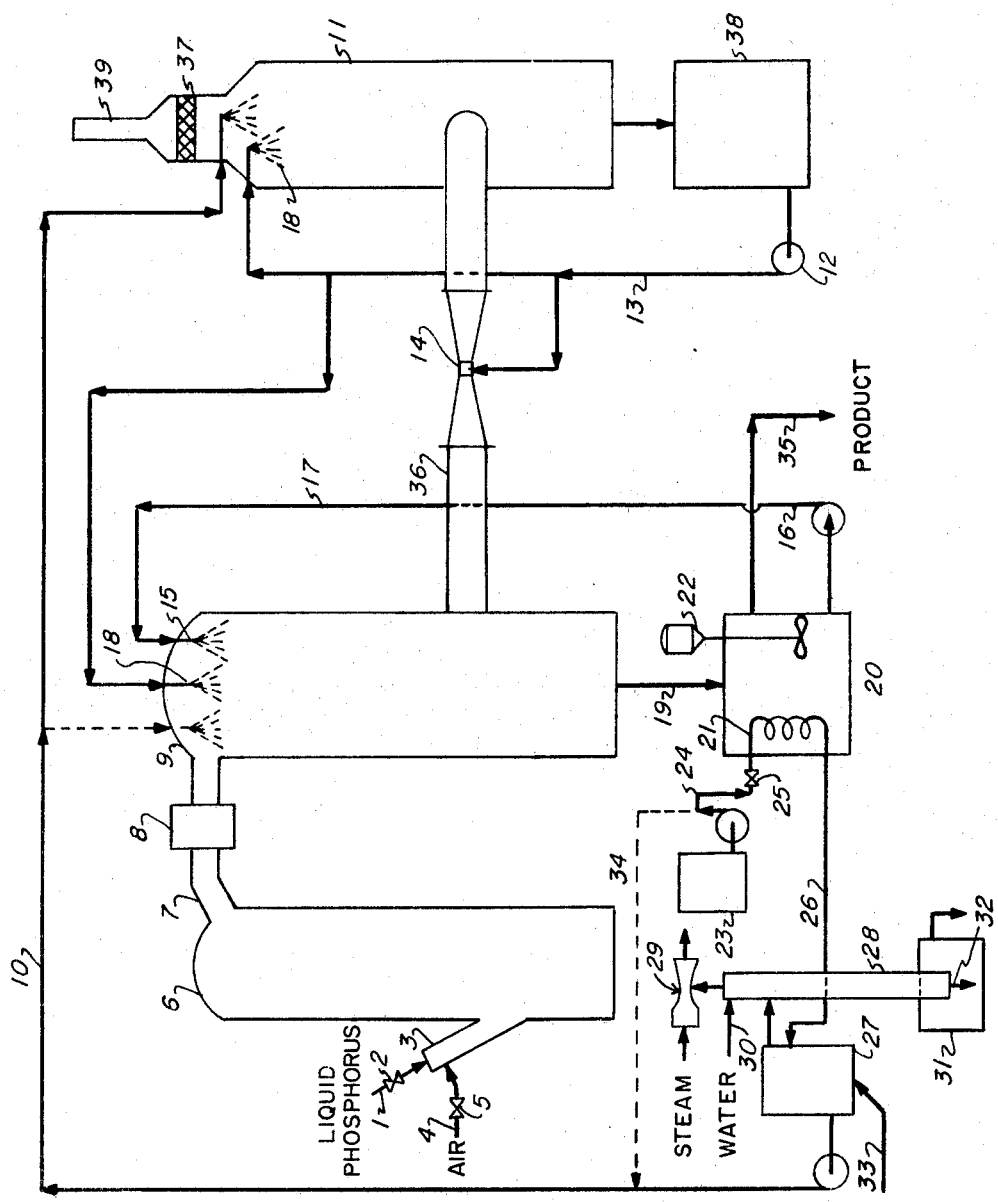

3,507,614
PROCESS FOR PRODUCTION OF
PHOSPHORIC ACID
Marcus M. Striplin, Jr., and Frank P. Achorn, Florence, Ala., assignors to Tennessee Valley Authority, a corporation of the United States
Filed Mar. 14, 1966, Ser. No. 534,053
Int. Cl. C01b 25/24
U.S. Cl. 23—165          5 Claims

ABSTRACT OF THE DISCLOSURE

In the usual process for making phosphoric acid by the "furnace" process, phorphorus is burned in air, and the combustion products are reacted with water. In the present method, the water is supplied in the form of crude dilute wet-process phosphoric acid made in the usual way by treating phosphate rock with an acid. In the present method, the wet-process acid is preheated by heat exchange with the combustion products, thereby driving off fluorine and some of the water. The operation is carried out under conditions which result in the formation of pyro- and higher acyclic polyphosphoric acids, thereby sequestering nonvolatile impurities from the wet-process acid.

Our invention relates to an improvement in phosphoric acid and an improved process for its production; more particularly to a process for the manufacture of concentrated relatively pure phosphoric acid from dilute impure wet-process acid and elemental phosphorus; and still more particularly to the production of such concentrated acid, including superphosphoric acid of 72 to 85 percent $P_2O_5$, by a method which employs a new, novel, and unique combination of the following operations: the combustion of elemental phosphorus to the pentoxide thereof with subsequent hydration; the concentration and polymerization of relatively dilute, impure wet-process phosphoric acid; the absorption of phosphorus pentoxide in an aqueous medium comprising a mixture of both furnace type and wet-process type phosphoric acids; and the removal of fluorine and other undesirable volatiles from the wet-process acid constituent.

In the superphosphoric acid range of concentration, which is of particular interest in connection with use of the acid in liquid fertilizers, as explained later, the acid produced is a mixture of orthophosphoric acid with pyro- and other acyclic phosphoric acids in proportions that vary with the total $P_2O_5$ content of the acid. The generic term "superphosphoric acid" and its analogy "polyphosphoric acid" have become widely accepted in the industry during the past few years to denote phosphoric acids having less water of constitution than orthophosphoric acid. In the pure system, i.e., when such superphosphoric acid is derived from the combustion of elemental phosphorus to the pentoxide and subsequent hydration thereof, the Canadian Journal of Chemistry, vol. 34 (1956), p. 790, shows that superphosphoric acid in the range from 69.81 to 84.95 percent $P_2O_5$ contains the following proportions of orthophosphoric acid and polyphosphoric acids, expressed as percent of total phosphorus:

97.85 to 2.32 percent ortho-
2.15 to 49.30 percent pyro-
0.00 to 24.98 percent tri-
0.00 to 16.99 percent tetra-
0.00 to 12.64 percent penta-
0.00 to 9.75 percent hexa-
0.00 to 8.62 percent hepta-
0.00 to 7.85 percent octa-
0.00 to 6.03 percent nona-
0.00 to 29.41 percent higher polymers.

Alternatively, if wet-process phosphoric acid is concentrated from the usual maximum of about 54 percent $P_2O_5$ up to the range of about 65 to 76 percent $P_2O_5$ by a process such as shown in copending application of John G. Getsinger, Ser. No. 835,377, filed Aug. 21, 1959, and assigned to the assignee of the present invention, equilibrium is attained very slowly and the distribution of ortho-, pyro-, and higher polymers of the polyphosphoric acid will be somewhat dissimilar to that shown in the above-mentioned Canadian Journal of Chemistry. The presence of the impurities in such concentrated wet-process phosphoric acid also is believed to cause a shift in the $H_2O:P_2O_5$ ratio in acids so concentrated, to somewhat alter the distribution of the various polymers.

As noted supra, "polyphosphoric acid" is used to define phosphoric acids having less water of constitution than orthophosphoric acid. Whereas orthophosphoric acid contains one atom of phosphorus per molecule and has a theoretical mol ratio of water to phosphorus pentoxide of 3.0, the polyphosphoric acids have two or more atoms of phosphorus per molecule in a chain or in alternating sequence with oxygen, and a theoretical mol ratio of water to phosphorus pentoxide of 2 or less. Polyphosphoric acid has two general forms—the acyclic and the cyclic. The cyclic is commonly called metaphosphoric acid. In the acyclic form, which is derived by limited molecular dehydration of orthophosphoric acid or by strict control of the amount of water used in hydration of $P_2O_5$, individual chains of phosphorus and oxygen atoms have terminal ends and a theoretical mol ratio of water to phosphorus pentoxide between 1 and 2. In metaphosphoric acid, which may be derived from the acyclic form by continued molecular dehydration, the chains are endless, thereby forming ring-like structures. Metaphosphoric acids have theoretical mol ratios of water to phosphorus pentoxide of 1. In practicing our invention, the acyclic species is formed by concentration of the ortho form and by control of the amount of water added as such or as dilute wet-process acid to combine with the $P_2O_5$ derived from the oxidation of phosphorus. The concentration or dehydration of the acid may be stopped before the meta species is formed; this species is ineffective in preventing the formation of precipitates in neutral salt solutions of liquid fertilizers and it forms salts with the metal impurities which are also insoluble in the acid.

The empirical formula for the desired acyclic polyphosphoric acid is:

$$H_{n+2}P_nO_{3n+1}$$

where:

H represents hydrogen
P represents phosphorus
O represents oxygen, and $n$ is greater than 1.

When $n=2$, the compound is commonly known as pyrophosphoric acid; when $n=3$, the compound is tripolyphosphoric acid.

Heretofore the prior art has generally suggested four methods for preparing the relatively pure (sometimes referred to as "furnace grade" or "white") superphosphoric acid.

(1) Burning phosphorus with air containing a controlled amount of moisture sufficient to produce phosphoric acid of the desired concentration, followed by cooling and collecting the resulting acid by mechanical means;

(2) Burning phosphorus with dried air, cooling and collecting the resulting dry, solid $P_2O_5$ and dissolving it in a quantity of water sufficient to form acid of the desired concentration;

(3) Burning phosphorus with undried air, followed by further hydration of the phosphorus pentoxide produced and recovery of the resulting acid mist in a packed tower, such as is shown in U.S. Patent 2,303,318; and (4) Burning phosphorus with dried air and absorbing the resulting phosphorus pentoxide vapor in phosphoric acid of slightly lower concentration than that desired in the product, as is shown in U.S. Patent 2,247,373, Hartford and Striplin, Jr.

More recently the art has also suggested another route to the production of superphosphoric acid, to wit, the thermal concentration of merchant-grade "wet-process" or "green" phosphoric acid containing from about 50 to 56 weight percent $P_2O_5$ up to the "superphosphoric acid" range of about 70 to 80 percent $P_2O_5$. Such methods teach the concentration and condensation of the starting constituent, wet-process orthophosphoric acid, up to the superphosphoric acid range either by submerged combustion methods at atmospheric pressure or by means of vacuum evaporation, as in the copending application of John G. Getsinger, Ser. No. 835,377, filed Aug. 21, 1959, assigned to the assignee of the present invention and in U.S. Patents 3,192,013, D. C. Young, and 3,073,677, Malley et al.

Difficulties and disadvantages have been present in all of these processes of the prior art. The present invention is essentially an improvement in process (3) above in unique combination with a variation of the recent art of thermal concentration of wet-process acid, said variation encompassing generally certain features relating to the use of a mixture of both wet-process phosphoric acid and furnace acid for collecting the phosphorus pentoxide vapor.

When acid of ordinary concentration is produced according to process (3) above, satisfactory control of the temperature in the production equipment may be obtained by introducing into the products of combustion an amount of water considerably in excess of that required for hydration of the phosphorus pentoxide and dilution of the resulting acid to the desired concentration; the excess of water undergoing vaporization and absorbing considerable amounts of latent heat. When superphosphoric acid is the product desired, the amount of water introduced into the process must be limited to prevent dilution of the product acid. The absorption of latent heat in the vaporization of water is thereby considerably reduced, so that the temperatures in the system are greatly increased unless the rate of phosphorus combustion is reduced to the point that loss of heat through the walls of the equipment is sufficient to prevent excessive temperatures. The reduction in the amount of water supplied to the system has a further undesirable effect in increasing the amount of acid mist or droplets carried out of the hydration zone with the effluent gases. This acid mist must be recovered in a subsequent step with the production also of a considerable quantity of acid somewhat more dilute than the desired product of the process.

With reference to process (3) above, a somewhat recent breakthrough in overcoming some of the disadvantages therein is found in U.S. Patent 2,999,010, Striplin et al., and more particularly in Patent 3,015,540, Striplin et al. These improvements employ a process which comprises burning phosphorus in air; passing the resulting hot phosphorus pentoxide into a hydration zone; spraying water into the hydration zone; spraying relatively cool dilute phosphoric acid from a later-mentioned step into the hydration zone as a free-falling spray of droplets; introducing relatively cool superphosphoric acid from another later-mentioned step into the hydration zone as a flowing film or as a free-falling spray of droplets; collecting sufficient additional phosphoric acid in the falling droplets of phosphoric acid to convert them to superphosphoric acid; withdrawing a hot gaseous effluent from the hydration zone; condensing a more dilute phosphoric acid from the effluent; returning the relatively cool, dilute phosphoric acid into the hydration zone as a spray; withdrawing superphosphoric acid from the lower part of the hydration zone and cooling it appreciably by any convenient means; returning a part of the relatively cool superphosphoric acid into the hydration zone as described above; and withdrawing the remaining cooled superphosphoric acid as the product of the process.

They have found that the return of the cooled, more dilute phosphoric acid to the hydration zone in the form of a free-falling spray is very effective in reducing temperatures and increasing the proportion of superphosphoric acid formed. The cooling effect is due to direct heat exchange between the hot gases and the relatively cool droplets, and to evaporation of water from the droplets. As a result, the quantity of phosphorus burned can be increased 10 to 15 percent or so without raising the temperature in the hydration zone to that normally encountered in producing superphosphoric acid. The gaseous effluent from the hydration zone also is considerably cooler, and corrosion of auxiliary equipment is reduced somewhat. The cooled acid also protects the interior walls of the equipment from corrosion when it is sprayed to form a film thereon.

However, the temperature of the superphosphoric acid collected in the hydration zone is higher than when acid of ordinary concentration is produced, and corrosion is greater than desirable. They have found that this temperature may be reduced and maintained at a satisfactory low level by removing heat from the superphosphoric acid after it has been withdrawn from the hydration zone and returning a portion of the relatively cool superphosphoric acid to the hydration zone as a film or spray to remove heat from the gases in that zone by direct exchange of sensible heat.

They have found that by utilizing the two means of heat removal mentioned above they can produce superphosphoric acid when burning phosphorus at rates as great as or greater than that usually employed in the same plant for the production of the more dilute acid commonly employed (55 to 58 percent $P_2O_5$), and to accomplish this without the temperatures in the system exceeding those observed when such more dilute acid is produced. They have also found that superphosphoric acid is less corrosive to most metals than more dilute acid at the same temperature.

We have developed a process for the production of phosphoric acid, including superphosphoric acid, by improving upon the latest teachings of Striplin et al., wherein the output of a furnace phosphoric acid plant may be significantly and substantially increased through the utilization of a unique combination of steps in our novel process which incorporates the use of wet-process phosphoric acid as both a cooling medium and a raw material constituent therein. In addition, in our novel process the utilization of the raw material wet-process phosphoric acid as a cooling medium offers a still further unsuspected and desirable result in that undesirable volatiles, such as fluorine, may be removed therefrom prior to introduction of a stream of said wet-process acid into the furnace acid plant with the production of acid of higher purity. This removal of such volatiles offers still a further advantage in that the raw material constituent from which they are eliminated is rendered substantially more compatible with the materials of construction of the furnace acid plant, thereby substantially eliminating other possibly deleterious corrosion characteristics.

A still further advantage of our novel process relating to the use of the wet acid in heat exchange means in the furnace acid plant results from the utilization of the heat generated by the reaction of the elemental phosphorus and air in a manner so as to concentrate in situ said wet-process phosphoric acid constituent without the expense of employing separate heat from fossil fuel, thereby realizing significant technical and economic advantages over prior-art processes relating to the concentration of wet-process phosphoric acid with the result that the cost of the phosphoric acid produced in our new, novel, and unique process is significantly lowered by (1) employing the use of raw material constituent, i.e., impure wet-process phosphoric acid, which is considerably less expensive than the price of furnace acid containing the same $P_2O_5$ values, and (2) by eliminating the use of external heat derived from the combustion of fossil fuel for concentrating wet-process phosphoric acid up to and including the superphosphoric acid range by conventional means. The saving and economic advantage realized herewith may be better understood when it is realized that in conventional processes for concentrating wet-process phosphoric acid, the cost of using an external heat source in a concentrator is approximately 7.00 per ton of $P_2O_5$ treated. This economical advantage may be more fully appreciated when it is understood that, in our process, we have found that in the production of superphosphoric acid of 76 percent $P_2O_5$ content (105 percent $H_3PO_4$ equivalent) acid as much as 1.4 pounds of $P_2O_5$ from 54 percent $P_2O_5$ wet-process phosphoric acid can be utilized per pound of $P_2O_5$ from elemental phosphorus burned. Additional economy may be obtained in our process by the use of crude, dilute, unconcentrated, wet-process acid of about 32 percent $P_2O_5$ content directly from the filters in place of the 54 percent $P_2O_5$ wet-process acid.

A still further advantage of our process is realized because of the shortage in the industry of elemental phosphorus ($P_4$) available for the production of phosphoric acid as in the latest teaching of Striplin et al. In our process, by supplementing the $P_4$ with wet-process phosphoric acid, the production of phosphoric acid per unit of available $P_4$ can be significantly increased. For example, calculations indicate that if a company producing liquid fertilizer from superphosphoric acid should use 3,000 tons of $P_4$ without the use of wet-process phosphoric acid they could produce about 19,000 tons of 11–37–0 liquid fertilizer solution, but if they should practice our process and use wet-process phosphoric acid as the water source in the phosphoric acid plant, they could produce about 42,000 tons of 11–37–0 liquid from this same 3,000 tons of $P_4$. The additional tons of $P_2O_5$ required to make this larger quantity of 11–37–0 solution would be supplied by the wet-process phosphoric acid.

With the trend toward an increased price of sulfur, several companies are interested in methods whereby less sulphur can be used to produce superphosphoric acid. The sulfur requirement for the production of this acid by our process would be less than the sulfur requirement for superphosphoric acid produced entirely from wet-process phosphoric acid. An additional advantage of our process is that it yields a pure acid with less likelihood of solid impurities forming in the acid than normally form in wet-process phosphoric acid. Some companies that produce wet-process superphosphoric acid have had difficulty with the formation of solid impurities. The possibility of solid materials forming in the superphosphoric acid from our process is much less than in acid from those processes in which all the $P_2O_5$ is supplied as wet-process phosphoric acid.

Therefore, an object of the present invention is to produce phosphoric acid under conditions of improved temperature control, thereby resulting in volatile impurities removal and reduced corrosive conditions by a process wherein the autogenous heat of combustion of elemental phosphorus is utilized to remove volatile impurities, including fluorine and water originally present in one constituent of the raw material feed in said process, and simultaneously to concentrate and condense the orthophosphoric acid present in said raw material constituent to higher acyclic polymers thereof.

Another object of the present invention is to produce phosphoric acid under conditions of improved temperature control thereby resulting in volatile impurities removal and reduced corrosive conditions by a process wherein the autogenous heat of combustion of elemental phosphorus is utilized to remove volatile impurities, including fluorine and water originally present in one constituent of the raw material feed in said process, and simultaneously to concentrate and condense the orthophosphoric acid present in said raw material constituent to higher acyclic polymers thereof, and which process further utilizes said volatile impurity-containing constituent as the heat exchange medium for cooling the superphosphoric acid product recovered subsequent to the hydration of the elemental phosphorus combustion products in a manner such that the requirement for external heat exchange medium is substantially eliminated therefrom.

Still another object of the present invention is to produce phosphoric acid under conditions of improved temperature control, thereby resulting in volatile impurities removal and reduced corrosive conditions by a process wherein the autogenous heat of combustion of elemental phosphorus is utilized to remove volatile impurities, including fluorine and water originally present in one constituent of the raw material feed in said process, and simultaneously to concentrate and condense the orthophosphoric acid present in said raw material constituent to higher acyclic polymers thereof; which process further utilizes said volatile impurity-containing constituent as the heat exchange medium for cooling the superphosphoric acid product recovered subsequent to the hydration of the elemental phosphorus combustion products in a manner such that the requirement for external heat exchange medium is substantially eliminated therefrom, and which process incorporates as said volatile impurity-containing raw material constituent orthophosphoric acid of the wet-process type in a manner such that a substantial portion of the $P_2O_5$ value in the superphosphoric acid end product is supplied by the $P_2O_5$ values in said orthophosphoric wet-process acid constituent of the raw material feed.

A further object of the present invention is to produce phosphoric acid under conditions of improved temperature control, thereby resulting in volatile impurities removal and reduced corrosive conditions by a process wherein the autogenous heat of combustion of elemental phosphorus is utilized to remove volatile impurities, including fluorine and water originally present in one constituent of the raw material feed in said process, and simultaneously to concentrate and condense the orthophosphoric acid present in said raw material constituent to higher acyclic polymers thereof, which process further utilizes said volatile impurity-containing constituent as the heat exchange medium for cooling the superphosphoric acid produce recovered subsequent to the hydration of the elemental phosphorus combustion products in a manner such that the requirement for external heat exchange medium is substantially eliminated therefrom, and which process incorporates as said volatile impurity-containing raw material constituent orthophosphoric acid of the wet-process type in a manner such that a substantial portion of the $P_2O_5$ value in the superphosphoric acid end product is supplied by the $P_2O_5$ values in said orthophosphoric wet-process acid constituent of the raw material feed, said process characterized by the fact that the output of $P_2O_5$ may be increased by as much as 100 percent without any increased rate of burning of elemental phosphorus therein.

Still further and more general objects and advantages of the present invention will appear from the more detailed description set forth below, it being understood, however, that this more detailed description is given by way of illustration and explanation only and not by way of limitation, since various changes therein may be made by those skilled in the art without departing from the spirit and scope of the present invention.

We have discovered that, in practicing our process in the pursuit of the foregoing and other objects of the present invention, said objectives may be realized in our process, which is essentially a new, novel, and unique method of employing wet-process phosphoric acid in a manner of fortification of a furnace phosphoric acid unit by carrying out essentially the following five steps:

(1) Burn phosphorus in a suitable combustion chamber with air in the conventional manner, as shown in Striplin et al.

(2) Pass the products of combustion containing phosphorus pentoxide into a suitable hydrator wherein the phosphorus pentoxide is converted to the desired concentrated phosphoric acid by contact with a dilute phosphoric acid mixture of both wet-process and electric-furnace types, to which some water may be added if desired.

(3) The concentrated product acid that drains from the hydrator is cooled and part of it is recycled to the hydrator to cool the gas and to protect the equipment therein. The remainder of this acid is withdrawn as product.

(4) The hot concentrated acid that drains from the hydrator is cooled in an appropriate acid-resistant heat exchanger by circulating cooling water through the heat exchanger in a conventional way or preferably by circulation of the dilute wet-process acid that is being introduced into the acid plant. By circulation of the incoming dilue wet-process acid through the heat exchanger, both the cooling of the concentrated acid and the heating of the incoming dilute wet-process acid are accomplished with the result that the heat of combustion of the phosphorus is utilized to aid in concentrating and purifying the wet-process acid.

(5) The resulting hot wet-process acid is passed through a vacuum evaporator. Subjecting the hot dilute acid to a vacuum causes the acid to boil and evolve water and fluorine compounds. Additional removal of fluorine and water would be accomplished by aerating the acid while it is in the vacuum evaporator. This treated acid is subsequently introduced into the furnace acid plant at either the hydrator or other appropriate points, as described later.

Our invention, together with its further objects and advantages, will be better understood from a consideration of the following description given in connection with the accompanying drawing which diagrammatically illustrates an application of the principles of our invention in one preferred embodiment thereof in which:

The figure is a flowsheet generally illustrating the principles of our novel process which results in substantial increase in output of furnace phosphoric acid plant installations through the use of wet-process phosphoric acid as a fortification of the raw material feed to the acid plant.

Referring now more specifically to the figure, phosphorus from a source not shown is fed via line 1 and means for control of flow 2 through phosphorus burner 3, together with air from a source not shown fed to burner 3 via line 4 and means for control of flow 5 into combustion chamber 6. The amount of air that is fed via line 4 through burner 3 is in excess of that required for the combustion of phosphorus fed via line 1 through burner 3. The products of combustion pass through duct 7, in which may be inserted a tubular gas cooler 8, into hydration chamber 9 at a temperature in the range of about 700° F. to about 2000° F. Wet-process phosphoric acid from later-mentioned heat exchange and volatile impurity removing steps from a source not shown, together with any desired additional water for hydration, may be fed through line 10 and sprayed into hydration chamber 9 and mist collector 11. Relatively cool, dilute phosphoric acid from a later step of the process also is fed by pump 12 via line 13 into hydration chamber 9, venturi collector 14, and mist collector 11, preferably through spraying devices 18, as shown. Alternatively, the cool, dilute phosphoric acid may be distributed over a bed of packing or other means of producing flowing films of acid to facilitate exchange of heat and water vapor between the dilute acid and the hot gases in hydration chamber 9.

Relatively cool concentrated acid from cooler 20 also is fed into hydration chamber 9 by pump 16 via line 17 through spraying devices 15, as shown, or it may be distributed over a bed of packing materials. The phosphorus pentoxide entering hydration chamber 9 is converted into phosphoric acid by reaction with the water content of both the dilute, impure wet-process phosphoric acid introduced via line 10, as described, and the dilute relatively pure acid introduced via line 13 through device 18, as described. Cooling of the gaseous and liquid contents of hydration chamber 9 is effected by contact with said dilute acids, the droplets, and film of relatively cool concentrated acid introduced at spraying devices 15, as described above. The mixture of acids constituting the acid product collects in the bottom of the hydration chamber 9 and is composed of droplets formed from hydration of the $P_2O_5$, the recycled acids, and the wet-process acid. The mixture of acids is withdrawn through line 19 to cooler 20. Cooler 20 is shown as a tank provided with heat exchanger, generally illustrated as 21, and with agitator 22 generally illustrated as a motor and impeller, to insure efficient heat exchange between the viscous concentrated phosphoric acid produced in hydration chamber 9 and removed via line 19, and the incoming raw material constituent dilute wet-process phosphoric acid. Preferably, orthophosphoric acid of the wet-process type from a source not shown is fed from tank 23 via line 24 and means for control of flow 25 into heat exchanger 21, wherein it is heated. The resulting hot wet-process phosphoric acid is led from heat exchanger 21 via line 26 into vacuum evaporator 27 equipped with barometric condenser 28 and steam jet vacuum pump 29. The hot dilute wet-process acid boils under the vacuum in evaporator 27 and gives up heat, water vapor, and volatile impurities, including fluorine; the water vapor and volatile fluorine compounds are condensed by the cold water which enters barometric condenser 28 via line 30 and are discharged to well 31 via line 32. Alternatively, to increase the stripping of fluorine from the incoming wet-process acid, air may be added to evaporator 27 via line 33. The air and noncondensable gases are removed from evaporator 27 by steam jet vacuum pump 29. The purified concentrated wet-process acid which has been cooled by boiling under vacuum is led from evaporator 27 via line 10 into the furnace acid plant either entirely into hydration chamber 9, as is shown and described above, or portions or all of said treated wet-process phosphoric acid may be led via line 10 and later split into two or more streams such that none or only a portion of the treated wet-process phosphoric acid enters hydration chamber 9, and the remaining portions enter the furnace acid plant at other appropriate points such as in the mist-collecting device 11.

Alternatively, a simpler version of our process would be to pass the untreated incoming dilute impure wet-process acid without prior treatment directly from tank 23 via line 34 and into hydration chamber 9 or mist collector 11 via line 10, or both.

Cooler 20, as is shown, may be interpreted to be a tank provided, for instance, with water-cooled coils 21, herein referred to as heat exchanger 21, and with an agitator generally illustrated as 22, to insure efficient heat exchange between the cooling water or the incoming wet-process phosphoric acid raw material constituent and the cooled acid product produced in hydration chamber 9 and drained therefrom via line 19. Obviously, however, other forms of coolers may be employed within the scope of our invention. Such forms of coolers could include shell and tube heat exchangers and evaporative or flash coolers.

The superphosphoric acid is withdrawn from hydrator chamber 9 at a temperature of 100° F. to about 400° F. and is cooled to a temperature in the range from about 90° F. to about 350° F. A portion of the cooled acid is withdrawn as the product of our process through line 35 to storage. The remainder of the cooled acid is fed by pump 16 via line 17 to hydration chamber 9, as described above.

A gaseous effluent is withdrawn through duct 36 from hydration chamber 9. This effluent comprises nitrogen and excess oxygen from the combustion air, together with some water vapor and entrained droplets of acid mist. This effluent, at a temperature in the range from about 150° F. to about 400° F., enters venturi mist collector 14 and thence passes to mist collector 11. Device 14 is shown as venturi collector in which the droplets of acid are caused to coalesce and undergo some dilution by partial condensation of the water vapor content of the gas. The coalesced acid droplets escaping device 14 are removed in mist after collector 11 which contains mesh filter 37. Other means of recovery of the entrained acid droplets or mist, such as packed-tower scrubbers, may be employed. In the instance wherein only a portion of the wet-process phosphoric acid constituent is added to hydration chamber 9, the remaining portion may be added, for example, to mist-collecting device 11. The relatively dilute acid, at a temperature in the range from about 90° F. to 250° F., is collected in tank 38, from which it is fed to hydration chamber 9, venturi collector 14, and mist collector 11, as described above.

Uncondensed gases consisting essentially of nitrogen, oxygen, and water vapor, usually at a temperature of less than 200° F., are discharged via stack 39 or other suitable waste-disposal means.

In the preferred embodiment of our invention shown above in both the figure and the description of the flow of materials therein, all of the wet-process phosphoric acid constituent is shown being heated and treated through heat exchanger 21 prior to its introduction into either the hydration chamber 9 or being split into portions and introduced in hydration chamber 9 and mist-collecting device 11. In another embodiment of our invention wherein the heat exchange requirement for cooling the acid produced in hydration chamber 9 and removed therefrom to cooler 20 via line 19 is reduced because of other conditions of operation of the equipment, and also in instances wherein the wet-process phosphoric acid raw material is derived through the leaching of either high-grade phosphate rock or rock which has been calcined prior to leaching. The rock is leached by reacting it with sulfuric acid. The gypsum is separated from the phosphoric acid-gypsum slurry by filtration. The resulting wet-process phosphoric acid is further clarified by additional gypsum removal. This clarified acid is introduced directly into the furnace-acid plant as, for instance, into the hydration chamber 9 rather than subjecting all of the wet-process acid feed to the heating and treating steps in heat exchanger 21. In still another version of this process, the filtered acid would be concentrated to the conventional 54 percent $P_2O_5$ merchant grade prior to introducing it into the furnace acid plant. Under some operating conditions it may be feasible to have all of the wet-process phosphoric acid raw material constituent bypass heat exchanger 21 and be directly introduced into the furnace acid plant either at hydration chamber 9, or at hydrator and mist-collecting device 11, as described above. It is therefore to be understood that, although in the preferred embodiment of our invention all of the wet-process raw material acid feed is shown to be heated, concentrated, polymerized, and stripped of volatiles, under some conditions of wet acid purity and furnace acid plant operating conditions, this step might possibly be partially or entirely circumvented.

In order that those skilled in the art may better understand how the present invention can be practiced, the following examples of processes we have used in the production of superphosphoric acid by fortifying the elemental phosphorus fed with $P_2O_5$ values from wet-process phosphoric acid are given by way of illustration and not by way of limitation.

EXAMPLE I

In one series of tests, the objectives therein were to determine the desirability and operativeness of our process when it is operated in its broadest sense, i.e., when the wet-process phosphoric acid feed is first heated and treated, as described above. These tests were made because it was deemed desirable to use portions of wet-process phosphoric acid in one of our commercially operating furnace phosphoric acid units instead of make-up water and thus to increase production of superphosphoric acid therein. In this investigation, the early tests were made with various mixtures and concentrations of wet-process and electric-furnace phosphoric acids, since different parts of the acid plant would be in contact with acids of different concentrations. These early tests showed that mixed acids of 65 and 76 percent $P_2O_5$ contents were less corrosive than straight 76 percent $P_2O_5$ electric-furnace acid. Subsequent thereto, additional tests were made with acids of 40 and 55 percent $P_2O_5$ contents. The temperatures used in the tests were 225° F. and 250° F., respectively, which is near the boiling point for these concentrations. It should be noted that metal temperatures in the plant are not this high because the metal is water cooled. However, these high temperatures were used to accentuate either the beneficial or detrimental effects due to the use of impure wet-process acid. The proportions of $P_2O_5$ from wet and furnace acids were 50:50 and 25:75. Tests also were made entirely with electric-furnace acid and entirely with wet-process acid. Both welded and unwelded specimens of Type 316 ELC stainless steel were used. The tests were conducted in thermal block corrosion test equipment for periods of 28 days without aeration. The results of these tests are shown in Table I below.

TABLE I.—CORROSION OF TYPE 316 ELC STAINLESS STEEL BY MIXTURES OF ELECTRIC-FURNACE AND WET-PROCESS PHOSPHORIC ACIDS CONTAINING 40 TO 55 PERCENT $P_2O_5$

[Temperature, 225°–250° F. (unaerated acid)]

| | Description of acid | | | | | | | | | Corrosion rate, mils/yr. | |
|---|---|---|---|---|---|---|---|---|---|---|---|
| | Source of $P_2O_5$, percent of total | | Anhydrous $P_2O_5$ | Chemical composition, percent | | | | | Acid temp., °F. | | |
| Test No. | W.P.A.[1] | E.F.A.[2] | | $P_2O_5$ | F [3] | $SO_3$ | $Al_2O_3$ | $Fe_2O_3$ | | Not welded | Welded |
| 1 | | | | | | | | | | | |
| 2 | 50 | 50 | | 40.2 | 0.53 (0.5) | 0.3 | 0.36 | 0.95 | 225 | 13 | 13 |
| | 25 | 75 | | 40.1 | 0.27 (0.3) | 0.2 | 0.09 | 0.48 | 225 | 13 | 10 |
| 3 | 100 | | | 40.7 | 1.1 (0.9) | 0.6 | 0.73 | 1.8 | 225 | 18 | 12 |
| 4 | | 100 | | 40.1 | <0.01 | Nil | Nil | Nil | 225 | 11 | <1 |
| 5 | 50 | [5] 33 | 17 | 55.6 | 0.62 (0.2) | 0.3 | 0.62 | 1.3 | 250 | 30 | 38 |
| 6 | 25 | 75 | | 54.9 | 0.37 (0.1) | 0.2 | 0.31 | 0.63 | 250 | 29 | 26 |
| 7 | [6] 100 | | | 55.2 | 0.52 (0.3) | 0.7 | 1.2 | 2.5 | 250 | 39 | 36 |
| 8 | | 100 | | 54.6 | <0.01 | Nil | Nil | Nil | 250 | 137 | 184 |

[1] Wet-process phosphoric acid from foam process pilot plant. Concentration was 40.7% $P_2O_5$ except as noted.
[2] Electric-furnace superphosphoric acid of 76% $P_2O_5$ content diluted as required to make grade except as noted.
[3] Parentheses show fluorine contents of acids after the 28-day test period.
[4] Specimen welded with Type 316 ELC electrode and air cooled.
[5] 83% $P_2O_5$ acid and some anhydrous $P_2O_5$ (17%) were used to make the desired grade.
[6] Acid was concentrated to 55% $P_2O_5$ by evaporation.

The results of these tests, as shown in Table I above, were unexpected and quite surprising in that these tests indicate that the feeding of filter-grade wet-process phosphoric acid to the furnace acid plant directly without the use of the volatile stripping step, as is taught in our preferred embodiment, should not cause a corrosion problem in the furnace acid plant. For instance, the corrosion rates of the Type 316 ELC stainless steel in the 40 percent $P_2O_5$ acid were in the range of 10 to 18 mils per year for all of the mixed and straight acids, which is quite low for the temperature of 225° F. used. The corrosion rate in the straight 55 percent $P_2O_5$ furnace acid at the somewhat higher temperature of 250° F. was 140 to 180 mils per year as opposed to much lower rates of corrosion in the mixed acids and the "straight" wet-process acid—25 to 40 mils per year. Again it should be noted that these corrosion rates are somewhat accentuated by the use of temperatures greater than those experienced by the water cooled stainless steel in our acid unit.

EXAMPLE II

Various embodiments of our process have been carried out as described above in full scale equipment. Table II below gives the pounds of dilute wet-process phosphoric acid that can be used in the furnace acid plant per pound of $P_4$ burned for various concentrations of wet-process phosphoric acid used and superphosphoric acid produced. These results are based on plant data. The pounds of water involved per pound of $P_4$ burned were obtained from operating data of TVA's new modern stainless steel phosphoric acid unit. The pounds of wet-process phosphoric acid added per pound of $P_2O_5$ from $P_4$ for each concentration of superphosphoric acid were calculated by using these operating data.

TABLE II.—ADDITION OF WET-PROCESS PHOSPHORIC ACID INSTEAD OF MAKE-UP WATER TO FURNACE ACID PLANT

| Wet-process phosphoric acid concentration, percent $P_2O_5$ | Production of 105% $H_3PO_4$ (76% $P_2O_5$) | | Production of 110% $H_3PO_4$ (80% $P_2O_5$) | |
|---|---|---|---|---|
| | Lbs. $H_2O$/ lb. of $P_4$ | Lbs. $P_2O_5$ from wet-process acid/lb. $P_2O_5$ from $P_4$ | Lbs. of $H_2O$/lb. of $P_4$ | Lbs. of $P_2O_5$ from wet-process acid/lb. $P_2O_5$ from $P_4$ |
| 30 | 1.0 | 0.25 | 0.929 | 0.24 |
| 40 | 1.0 | 0.492 | 0.929 | 0.457 |
| 54 | 1.0 | 1.39 | 0.929 | 1.29 |

These data indicate that in the production of superphosphoric acid containing 80 percent $P_2O_5$ as much as 1.29 pounds of $P_2O_5$ from 54 percent $P_2O_5$ wet-process phosphoric acid can be utilized per pound of $P_2O_5$ from $P_4$. Also, these data show that in the production of the 80 percent $P_2O_5$ superphosphoric acid about 0.24 pound of $P_2O_5$ from 30 percent $P_2O_5$ wet-process phosphoric acid can be utilized per pound of $P_2O_5$ from $P_4$.

These data also show that in the production of 76 percent $P_2O_5$ superphosphoric acid, 1.39 pounds of $P_2O_5$ from 54 percent $P_2O_5$ wet-process acid or 0.25 pound of $P_2O_5$ from 30 percent $P_2O_5$ wet-process acid can be utilized per pound of $P_2O_5$ from $P_4$.

Thus, it was possible to produce superphosphoric acid at production rates substantially increased over those that could be employed without the use of our invention of supplementing the elemental phosphorus requirements with values of $P_2O_5$ derived from the use of wet-process phosphoric acid as raw material feed and with temperature conditions in the plant no higher than normal operation of our exisitng phosphoric acid unit.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. In an improved process for the production of superphosphoric acid comprising the steps of burning phosphorus in air; passing the resulting hot phosphorus pentoxide at an initial temperature in the range from about 700° F. to about 2000° F. into a hydration zone; introducing dilute phosphoric acid from a later mentioned effluent recovery step and at a temperature in the range from about 90° F. to about 250° F. into said hydration zone; introducing superphosphoric acid from later mentioned superphosphoric acid recovery and cooling steps and at a temperature in the range from about 90° F. to about 350° F. into said hydration zone; adjusting the relative proportions of hot phosphorus pentoxide, of acids, and of water contained therein introduced to maintain in said hydration zone a resulting collected superphosphoric acid; withdrawing a hot gaseous effluent at a temperature in the range from about 150° F. to about 400° F. from said hydration zone; collecting dilute phosphoric acid from said effluent; returning the resulting dilute phosphoric acid at a temperature in the range from about 90° F. to about 250° F. into said hydration zone; withdrawing superphosphoric acid, from a lower portion of said hydration zone at a temperature in the range from about 150° F. to about 400° F.; cooling said withdrawn superphosphoric acid to a temperature in the range from about 90° F. to about 350° F.; returning a portion of the cooled superphosphoric acid into said hydration zone; and withdrawing the remaining portion of the cooled superphosphoric acid as product;

the improvement in combination therewith for substantially increasing the output of $P_2O_5$ therefrom without any increased rate of burning of elemental phosphorus therein, which improvement comprises the steps of:
(1) introducing relatively dilute and impure wet-process phosphoric acid into heat exchange contact with said superphosphoric acid, said superphosphoric acid (a) being at a temperature in the range from about 90° F. to about 350° F.; and (b) withdrawn from said lower portion of said hydration zone, an dsaid impure wet-process phosphoric acid consisting of orthophosphoric acid;
(2) simultaneously
   (a) cooling said withdrawn superphosphoric acid in said heat exchange contact with said wet-process phosphoric acid to a temperature in the range from about 90° F. to about 350° F.;
   (b) heating said introduced wet-process phosphoric acid in said heat exchange contact with said superphosphoric acid up to the range from about 90° F. to about 350° F.;
   (c) removing volatiles including water vapor and fluorine from the resulting heated wet-process phosphoric acid introduced into said heat exchange contact with said superphosphoric acid; and
   (d) concentrating and condensing said wet-process phosphoric acid during said heating and volatile impurity removing step so as to initiate the formation of pyrophosphoric and higher acyclic polyphosphoric acids in the resulting heated and treated wet-process phosphoric acid; and
(3) subsequently introducing said resulting heated and treated wet-process phosphoric acid into said hydration zone;
said improvement characterized by the fact that the introduction of said resulting heated and treated wet-process phosphoric acid into said hydration zone substantially increases the output of $P_2O_5$ from said improved process for a given rate of burning of phosphorus therein; the ratio of said increased $P_2O_5$ output (expressed as pounds of $P_2O_5$ from wet-process phosphoric acid:pounds of $P_2O_5$ from $P_4$) being up to 1.4.

2. The process of claim 1 in which only a portion of the heated and treated wet-process phosphoric acid is introduced into said hydration zone; and combining the remaining portion of said heated and treated wet-process phosphoric acid with said dilute phosphoric acid collected from the effluent leaving said hydration zone.

3. The process of claim 1 in which a portion of the wet-process phosphoric acid feed stream is diverted from the step of introduction into heat exchange contact with said superphosphoric acid withdrawn from a lower portion of said hydration zone; and is introduced directly into said hydration zone.

4. The process of claim 3 in which that portion of wet-process phosphoric acid raw material feed which is diverted from heat exchange contact with said superphosphoric acid is further divided with a portion thereof being fed directly into said hydration zone and the remaining portion thereof being combined with the dilute phosphoric acid collected from the effluent from said hydration zone.

5. The process of claim 1 in which a substantial portion of said wet-process acid is brought directly, without prior treatment, into contact with said hot gaseous effluent from said hydration zone; subsequently collecting dilute phosphoric acid from said effluent; and introducing said dilute phosphoric acid into said hydration zone.

References Cited

UNITED STATES PATENTS

| | | | |
|---|---|---|---|
| 1,889,949 | 12/1932 | Clark | 23—165 |
| 3,015,540 | 1/1962 | Striplin et al. | 23—165 |
| 3,193,350 | 7/1965 | Beltz et al. | 23—165 |

OSCAR R. VERTIZ, Primary Examiner

G. A. HELLER, Assistant Examiner